(12) United States Patent
Lewis

(10) Patent No.: US 8,527,148 B2
(45) Date of Patent: Sep. 3, 2013

(54) CONTROL SYSTEM FOR CONTROLLING A MOTOR ARRANGEMENT FOR DIFFERENTIALLY DRIVING LEFT AND RIGHT WHEELS OF A MOTORIZED VEHICLE

(75) Inventor: Jason David Lewis, Christchurch (GB)

(73) Assignee: P G Drives Technology Limited, Christchurch (GB)

( * ) Notice: Subject to any disclaimer, the term of this patent is extended or adjusted under 35 U.S.C. 154(b) by 842 days.

(21) Appl. No.: 12/516,393

(22) PCT Filed: Jul. 19, 2007

(86) PCT No.: PCT/GB2007/002720
§ 371 (c)(1),
(2), (4) Date: Dec. 14, 2009

(87) PCT Pub. No.: WO2008/065322
PCT Pub. Date: Jun. 5, 2008

(65) Prior Publication Data
US 2010/0114433 A1 May 6, 2010

(30) Foreign Application Priority Data
Nov. 30, 2006 (GB) .................................. 0623895.0

(51) Int. Cl.
*B62D 7/04* (2006.01)
(52) U.S. Cl.
USPC ............................................ 701/41; 303/140
(58) Field of Classification Search
USPC ........................... 701/41, 70; 303/140, 113.2
See application file for complete search history.

(56) References Cited

U.S. PATENT DOCUMENTS

| 5,636,909 A * | 6/1997 | Hirao et al. ................... 303/140 |
| 6,202,773 B1 | 3/2001 | Richey, II et al. |
| 6,708,088 B2 * | 3/2004 | Matsuno et al. .................. 701/1 |
| 6,909,959 B2 * | 6/2005 | Hallowell ....................... 701/88 |
| 2004/0176899 A1 | 9/2004 | Hallowell |

FOREIGN PATENT DOCUMENTS

| DE | 19815348 | 10/1998 |
| GB | 2383567 | 7/2003 |
| WO | WO01/08922 | 2/2001 |
| WO | WO2004041614 | 5/2004 |

* cited by examiner

*Primary Examiner* — Dalena Tran
(74) *Attorney, Agent, or Firm* — Gordon & Jacobson, PC

(57) ABSTRACT

A control system for controlling a motor arrangement for differentially driving left and right wheels of a motorized vehicle, the control system comprising: a comparator for receiving yaw rate sensor signals from a yaw rate sensor attached to the vehicle, the yaw rate sensor signals being indicative of actual yaw rates of the vehicle and for receiving yaw rate reference signals generated by a user input device, the yaw rate reference signals being indicative of user demanded yaw rates for the vehicle, the comparator arranged to output yaw rate error signals based on the difference between the yaw rate sensor signals and the yaw rate reference signals; a control loop for processing the yaw rate error signals to generate yaw rate correction signals for controlling the motor arrangement to reduce the yaw rate error signals, wherein the control loop comprises a variable limiter for limiting the yaw rate correction signals to values within a variable limit, the variable limit varying in dependence upon the yaw rate error signals.

19 Claims, 3 Drawing Sheets

CONTROL SYSTEM FOR CONTROLLING A MOTOR ARRANGEMENT FOR DIFFERENTIALLY DRIVING LEFT AND RIGHT WHEELS OF A MOTORIZED VEHICLE

BACKGROUND OF THE INVENTION

1. Field of the Invention

The present invention relates to a control system for controlling a motor arrangement for differentially driving left and right wheels of a motorized vehicle, in particular but not exclusively, a powered wheelchair.

2. State of the Art

An electrically powered wheelchair typically has two independently driven electric motors, one for driving a left wheel of the wheelchair and the other for driving a right wheel of the wheelchair. The differential speed of these motors controls the forward speed and turn rate of the wheelchair.

A typical wheelchair is provided with an input device, usually a two axis joystick, to which a user applies stimuli in order to generate forward speed and yaw rate reference signals. A control module receives the reference signals from the input device, and processes the signals to calculate left and right motor speed reference signals that are compared to signals indicative of actual measurements of the current left and right motor speeds. The differences between the reference motor speed signals and the actual motor speed signals are used by a closed loop control system to apply voltages to the motors to drive the wheels to maintain the wheelchair at the user demanded speed and heading.

Such a closed loop control is usually achieved by what is known as the IR compensation technique. IR compensation is a method used to compensate for the fall in a motor's speed due to the voltage drop across its armature resistance (R) when current (I) is flowing in the motor's armature winding. IR compensation causes the velocity control loop to increase the motor voltage and motor current to stabilise the motor's speed when the motor load increases. If the R term is set too high, the positive feedback mechanism inherent in the IR compensation method causes a control problem and the control loop becomes unstable.

For example, as load is applied the motor, the over compensated IR term in the velocity feedback calculation causes the velocity control loop to increase the motor voltage to an extent where the motor's speed and current are forced to increase. Consequently, the velocity loop reacts to further increase the motor voltage, which further increases the motor speed and current. This runaway effect of the motor velocity causes speed instability of the motor's closed velocity loop. It is therefore not possible to compensate for the full armature resistance of the motor and this leads to an error in the velocity feedback signal which can, under certain driving conditions, affect the controllability of the wheelchair.

There are several potential wheelchair control problems that may result from anomalies in IR compensation. For example, when manoeuvering at low speeds in restricted spaces, if the wheelchairs' motor loads do not remain constant, the user will need to constantly make corrections to keep the wheelchair on a desired course by varying the displacement of the joystick. This is because the error in the velocity feedback signal caused by the low R term varies with motor load and the only way to maintain a constant velocity is to compensate for this error by varying the input demand. This makes manoeuvers in constricted, cluttered spaces difficult and it often leads to collisions because the user lacks sufficient fine, low speed control. Examples include passing through narrow doorways, driving along narrow corridors and docking at a table. These manoeuvers are most difficult when driving on high friction surfaces such as carpets.

Control problems may also occur when driving at high forward speeds, because any sudden asymmetric loading of the right and left wheelchair motors will tend to cause the motor with the decreasing load to speed up and the motor with the increasing load to slow down which results in the wheelchair veering off its intended course.

Furthermore, when driving a wheelchair across a camber, asymmetric loading of the right and left wheelchair motors causes the wheelchair to veer down the camber even though the user demands to drive across it.

Also when driving over obstacles, asymmetric loading of the wheelchair motors can cause the wheelchair to deviate sharply from its intended direction of travel.

U.S. Pat. No. 6,202,773 describes a motorized wheelchair provided with a rate-of-turn feedback sensor and with forward/reverse motion, lateral motion, and vertical motion acceleration feedback sensors that are integrated into a closed-loop wheelchair servo control system to differentially control the rotational speed of a pair of motor driven wheels.

SUMMARY OF THE INVENTION

Embodiments of the present invention aim to provide an improved control system for controlling a motor arrangement for differentially driving a motorized vehicle.

According to the present invention there is provided a control system for controlling a motor arrangement for differentially driving left and right wheels of a motorized vehicle, the control system comprising: a yaw rate feedback control loop comprising: a comparator for receiving a yaw rate sensor signal from a yaw rate sensor, the yaw rate sensor signal being indicative of an actual yaw rate of the vehicle and for receiving a yaw rate reference signal generated by a user input device, the yaw rate reference signal being indicative of a user demanded yaw rate for the vehicle, the comparator arranged to output a yaw rate error signal based on the difference between the yaw rate sensor signal and the yaw rate reference signal; a variable limiter for limiting a yaw rate correction signal to values within a variable limit, the yaw rate correction signal for controlling the motor arrangement to reduce the yaw rate error signal; a limit calculator for continuously calculating the variable limit in dependence upon one or more signals input to and/or generated by the control loop.

BRIEF DESCRIPTION OF THE DRAWINGS

Embodiments of the invention will now be described by way of example only with reference to the accompanying drawing in which.

DETAILED DESCRIPTION OF THE PREFERRED EMBODIMENT

Figure 1:
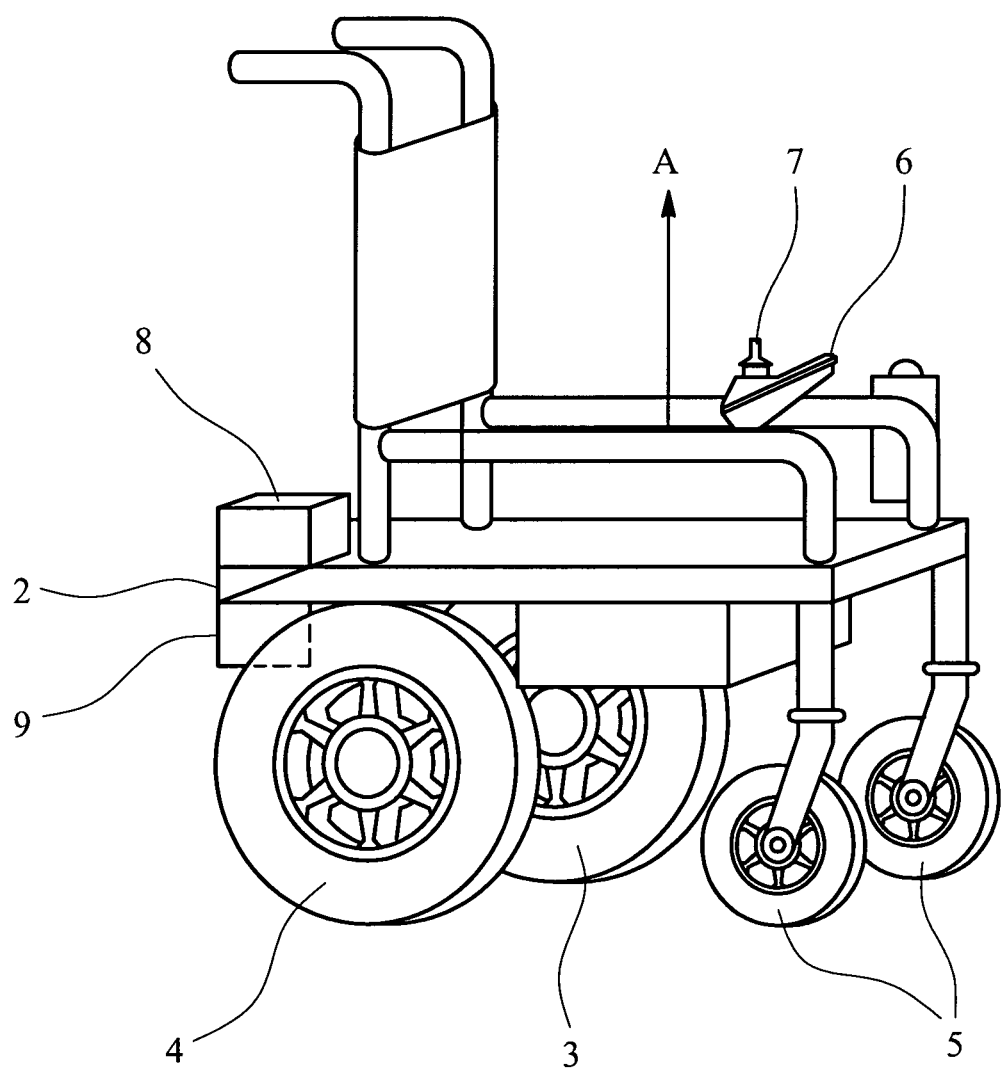
FIG. 1 is a schematic diagram of a motorized wheelchair.

Referring to FIG. 1, electrically powered wheelchair 1 comprises a chassis 2, a rear left driven wheel 3, a rear right driven wheel 4 and a pair of leading castors 5. The wheelchair 1 is also provided with two independently driven electric motors (not shown in FIG. 1), namely, a left motor for driving the rear left wheel 3 and a right motor for driving the rear right wheel 4. A battery (B) provides power for the wheelchair 1.

A user control input module 6 comprising an input device 7, typically in the form of a joystick, provides a means by which a user (not shown) can input forward/reverse speed demand signals and angular rate of turn demand signals to the wheelchair. The angular rate of turn of the wheelchair (or yaw rate) is the rate of rotation of the wheelchair about its vertical axis (A). The user input forward/reverse speed demand signals and yaw rate demand signals indicate the user's desired forward/reverse speed and yaw rate respectively for the wheelchair. By manipulating the input device 7, a user can thus cause the wheelchair to move forwards or backwards and to turn left or right.

A yaw rate sensor module 8 is fitted to the wheelchair chassis 2 to measure the actual yaw rate of the wheelchair 1 and to generate a signal indicative of this actual yaw rate.

A control module 9, also fitted to the chassis 2, receives user forward/reverse speed demand signals and user yaw rate demand signals from the input module 6 and actual yaw rate signals from the sensor module 8. The control module 9 processes the received signals and uses the processed signals to control the right and left motors (not shown) of the wheelchair 1.

The control module 9 compares the yaw rate demanded by the user with the actual yaw rate signal produced by the sensor module 8. The difference between these signals (error signal) is fed through a closed control loop, which calculates a correction yaw demand to reduce the heading error of the wheelchair, 1. So for example, the control module 9 increases or decreases the yaw demand to the motors to maintain the wheelchair on its desired course.

Fitting a yaw rate sensor to the wheelchair chassis to measure the yaw rate of the wheelchair and using the output to correct for deviations caused by the anomalies of IR compensation can improve the controllability of the wheelchair and increase the safety of the wheelchair user. The fine turn control also provides superior control for people with severely impaired motion skills.

Advantageously, the control module 9 executes a self-limiting yaw control algorithm that detects if the motion of the wheelchair 1 is unstable, and in response reduces the amount of power to the drive wheels 3 and 4 until the wheelchair's 1 instability is reduced. This is accomplished by monitoring error signals within the control system and using the magnitude of these error signals to limit both the output of the closed yaw rate control loop and the inputted user reference signals.

The self-limiting algorithm attempts to maintain stability of the wheelchair 1 at all times and prevents the wheelchair 1 from behaving aggressively when the closed yaw rate control loop reacts to large errors in the system.

Additionally, when a sensor failure occurs, the magnitude and duration of the errors occurring within the yaw rate control system are large and the self-limiting algorithm reacts by slowing the wheelchair 1 down without causing significant veering. A sustained fault will cause the self-limiting algorithm to reduce the speed of the wheelchair 1 until it has stopped.

Figure 2:
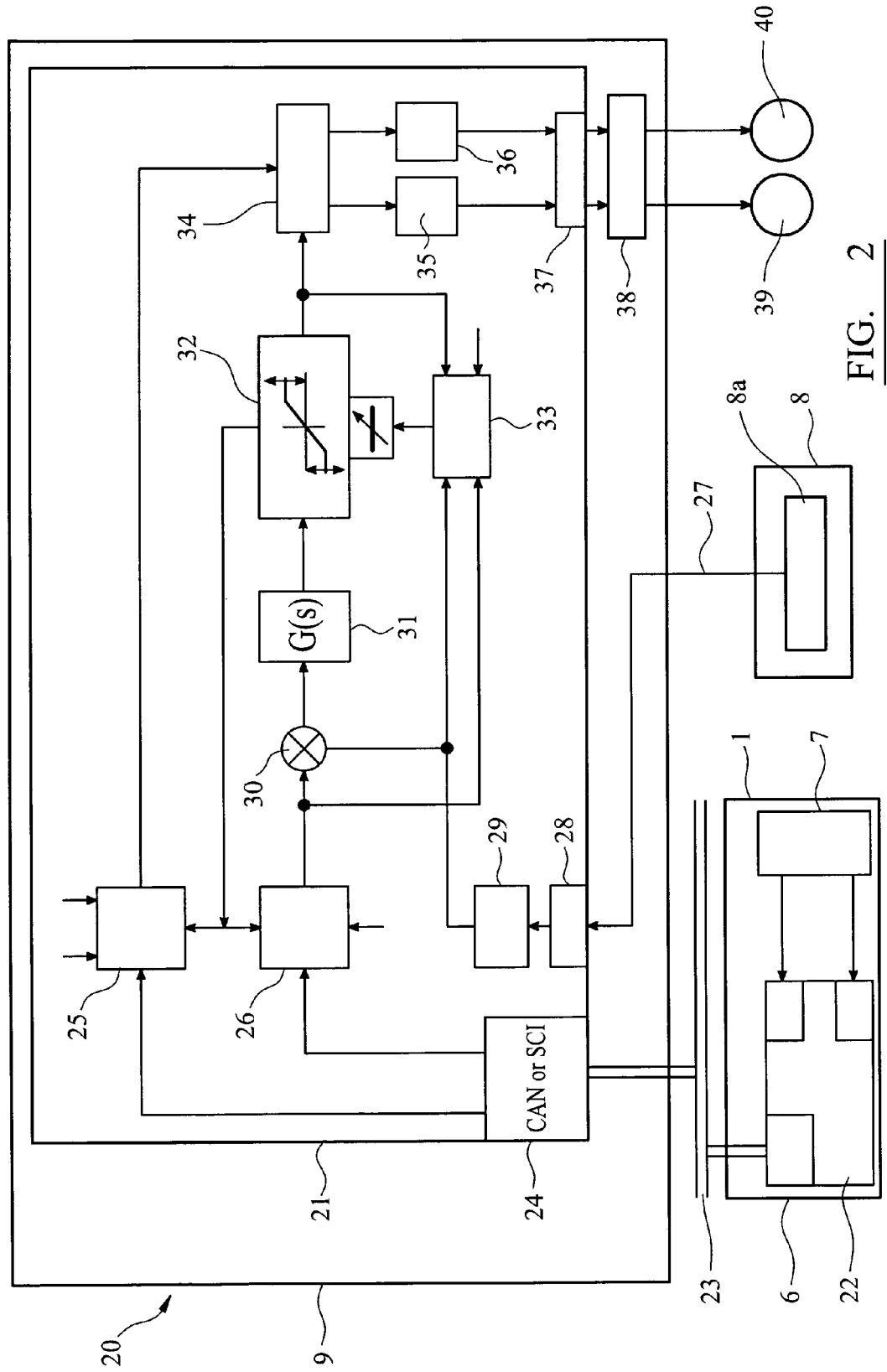
FIG. 2 is a schematic diagram of a control system for a motorized wheelchair.

Referring now to FIG. 2 of the accompanying drawings a control system 20 for the wheelchair 1 comprises the user input control module 6, the yaw rate sensor module 8 which comprises a yaw rate sensor 8a and the control module 9. The control module 9 in turn comprises a microprocessor 21.

In a preferred embodiment, the yaw rate sensor 8a is a MEMS (Micro Electro Mechanical System) angular rate sensor, although other types of angular rate sensors may be used. As will be appreciated by those skilled in the art, the yaw rate sensor 8a should be mounted so that its positive yaw sensitive axis (not shown) is substantially aligned with the vertical axis of the wheelchair 1. Thus, as illustrated in FIG. 2, the yaw rate sensor module 8 is best located on the wheelchair 1 remotely from the control module 9 so that no constraints are placed on the orientation of the control module 9.

Alternatively, the yaw rate sensor 8a may be housed within the control module 9, although this would require mounting the control module 9 to the wheelchair 1 in an orientation that aligned the yaw rate sensor's positive yaw sensitive axis (not shown) with the vertical axis of the wheelchair 1. The user input module 6 comprises the user input device 7 and a first microcontroller 22. In response to user manipulation, the user input device 7 generates an analogue forward (or reverse) speed demand signal (y) and an analogue yaw rate demand signal (x) the values of which are indicative respectively of the user's desired forward (or reverse) speed and yaw rate for the wheelchair 1.

The first microcontroller 22 receives the analogue forward speed demand signal (y) and yaw rate demand signal (x) from the user input device 7, converts the signals into a digital forward speed demand signal ($v_i$) and a digital yaw rate demand signal ($\omega_i$) respectively, and outputs these digital signals in a suitable digital communications format, for example Serial Communications Interface (SCI) or Controller Area Network (CAN) on a BUS system 23 connected to a data input port 24 of the microprocessor 21.

The data input port 24 decodes and outputs the digital forward speed demand signal ($v_i$) to a forward speed signal conditioning block 25 and the digital yaw rate demand signal ($\omega_i$) to a yaw rate signal conditioning block 26. The forward speed signal conditioning block 25 processes the forward speed demand signal ($v_i$) to output a processed forward speed reference signal ($v_r$), and the yaw rate signal conditioning block 26 processes the digital yaw rate demand signal ($\omega_i$) to output a processed yaw rate reference signal ($\omega_r$). This processing filters the signals to smooth them so as to prevent sudden or jerky movements of the wheelchair 1. Such processing is well known to those skilled in the art and will not be described in detail herein.

As will be explained in greater detail below, at certain instances when the wheelchair is moving in an unstable manner, the forward speed signal conditioning block 25 and the yaw rate signal conditioning block 26 are arranged to reduce the values of the forward speed reference signals and the yaw rate reference signals to enable the wheelchair to recover stability.

The yaw rate sensor 8a generates an analogue yaw rate signal (z), which is output via a cable 25 to an Analogue to Digital (A/D) converter 28 on the processor 21. The converter 28 digitises the signal and outputs the digital signal (z') to a yaw rate sensor signal-conditioning block 29.

The yaw rate sensor signal conditioning block 29 processes the digital signal (z') to remove the yaw rate sensor's 8a signal offset and to scale (i.e calibrate) the signal to generate an actual yaw rate signal ($\omega_g$) indicative of the real time yaw rate of the wheelchair 1 in degrees per second. The yaw rate sensor's 8a signal offset typically results from a combination of the zero degrees per second output of the sensor, plus any associated zero degree error output, for example one caused by drift. Again, processing techniques for removing this offset and scaling the signal are well known in the art and will not be described in detail herein.

The system further comprises a yaw control loop comprising a comparator 30, a compensator 31 and a variable limiter 32.

The comparator 30 receives at a first input (+) the rate limited yaw rate reference signal ($\omega_r$) output from the yaw rate signal conditioning block 26, and at a second input (−) the actual yaw rate signal ($\omega_g$) output from the yaw rate sensor signal conditioning block 29. The comparator 30 outputs the difference between the rate limited yaw rate reference signal ($\omega_r$) and the actual yaw rate signal ($\omega_g$) to produce a yaw rate error signal ($\omega_e$) where $\omega_e = \omega_r - \omega_g$. Thus, at any given time, the yaw rate error signal represents the difference between the yaw rate demanded by the user and the actual yaw rate of the wheelchair as measured by the sensor 8a.

The yaw rate error signal ($\omega_e$) is fed to the input of the compensator 31, typically a PI (proportional integral) or a PID (proportional integral derivative), which calculates a corrective yaw rate signal ($\omega_u$) for use in controlling the wheelchair's drive motors to reduce the yaw rate error signal ($\omega_e$). Again, PI and PID control loops are well known in the art and so will not be described herein.

The corrective yaw rate signal ($\omega_u$) is fed to the input of the variable limiter 32 which functions to limit $\omega_u$ to a value within the constraints $\pm \omega_{sat}$, where $\omega_{sat}$ is a variable yaw rate saturation limit.

The variable limiter 32 thus outputs a compensated yaw rate correction signal ($\omega_o$) to be used to calculate reference speeds for the wheelchair's drive motors and is given by:

if($\omega_u > +\omega_{sat}$), $\omega_o = +\omega_{sat}$ else if($\omega_u < -\omega_{sat}$), $\omega_o = -\omega_{sat}$ else, $\omega_o = \omega_u$ A saturation calculation block 33 continuously derives the variable limit $\omega_{sat}$ in accordance with the relationships:

$$\omega_{sat} = |\omega_r| + \omega_c - IoError - YawRateOfChange_n \{\omega_{sat} = 0, \text{ if } (\omega_{sat} < 0)$$

$$YawRateOfChange_n = \left|\frac{\Delta\omega_g}{\Delta T}\right| k_d$$

$$\begin{cases} YawRateOfChange_n = \left|\frac{\Delta\omega_g}{\Delta T}\right| k_d, & \text{if } (YawRateOfChange_n > YawRateOfChange_{n-1}) \\ YawRateOfChange_n = \\ YawRateOfChange_n - & \text{if } (|\omega_e| < \omega_{e,Threshold} \text{ and } IoError < IoError_{Thresh}) \\ SlewRate, \end{cases}$$

$$IoError = |\omega_r - \omega_o| k_{ro}$$

Wherein:

$\omega_{sat}$ is the variable yaw rate saturation limit of the variable limiter 32;

$\omega_o$ is the limited compensated yaw rate signal output by the variable limiter 32;

$\omega_r$ is the previously discussed processed yaw rate reference signal;

$\omega_e$ is the previously discussed yaw rate error signal;

$\omega_c$ is a programmable constant representing an additional correction yaw rate (programmable typically between 50 and 150 degrees per second)

$k_{ro}$ is a value for the control loop input output error gain (typically 1 to 4)

$k_d$ is a value for the yaw rate of change gain (typically 8 to 32 with $\Delta T = 20$ milli-seconds);

$\omega_{e,Threshold}$ is a pre-selected constant, typically 20 to 40 degrees per second;

$IoError_{Threshold}$ is a pre-selected constant, typically 20 to 40 degrees per second;

SlewRate is a pre-selected constant typically 50 to 150 degrees per second per second.

To perform the calculation, the saturation calculation block 33 is connected to the outputs of the yaw rate signal conditioning block 26, the yaw rate sensor signal-conditioning block 29 and the variable limiter 32 for receiving as input the signals $\omega_r$, $\omega_g$, and $\omega_o$ respectively and is pre-programmed with values for the constants $\omega_c$, $k_{ro}$, $k_d$, $\omega_{e,Threshold}$, $IoError_{Threshold}$ and SlewRate.

The purpose of the variable limiter 32 is to limit the output $\omega_o$ in the event of a failure of the yaw rate sensor 8a or if wheelchair instability occurs during a manoeuvre. The variable limiter 32 achieves this by having its limits reduced by signals and the rate of change of signals generated within the yaw control system. The two terms that are responsible for reducing the saturation level of the variable limiter are namely the IoError term and the rate of change of the actual yaw rate signal $\omega_g$.

The IoError term in the $\omega_{sat}$ calculation is mainly responsive to wheelchair instability. For example, when making a manoeuvre at a high forward speed, the wheelchair 1 may be unable to carry out the high-speed manoeuvre because of its dynamics or because there is not enough power available from its motor arrangement. Consequently, the closed yaw control loop is unable to reduce the yaw rate error signal ($\omega_e$) to zero and the compensator 31 causes an increase in the output of the yaw control loop ($\omega_o$) giving rise to an increase in the IoError term. The increasing IoError term reduces the variable limiter's 32 saturation limit $\omega_{sat}$ causing the yaw control loop to saturate more easily.

Once the yaw control loop saturates, the value of the output $\omega_o$ is insufficient for the wheelchair 1 to achieve the yaw rate indicated by yaw rate demand signal $\omega_r$ (i.e. the yaw rate the user would like the wheelchair 1 to have) and yaw demand to the motor arrangement is restricted. It becomes necessary to reduce the forward speed reference signal ($v_r$) to slow the wheelchair 1 down so that the manoeuvre can be achieved at a more stable slower forward speed. In this event, it is also becomes advantageous to reduce the yaw rate reference signal $\omega_r$ to force the yaw rate error signal $\omega_e$ to be reduced and to allow the variable limiter saturation limit ($\omega_{sat}$) to recover back to a higher value. A process for automatically reducing the forward speed reference signal ($v_r$) and the yaw rate reference signal ($\omega_r$) when the control loop saturates will be described later below.

The term indicative of the rate of change of the actual yaw rate signal ($\omega_g$) in the calculation of ($\omega_{sat}$) is mainly responsive to faults within the yaw control system. For example, in the event of a yaw rate sensor 8a fault, a large yaw rate error signal ($\omega_e$) would likely occur and the closed yaw control loop would react by increasing its output ($\omega_o$) to a correspondingly high value. Consequently, a high yaw rate demand would be applied to the motors causing the wheelchair 1 to suddenly veer or spin out of control.

The rate of change term in the $\omega_{sat}$, calculation prevents this by quickly reducing $\omega_{sat}$ to limit the output of the closed yaw control loop when a rapid change in the actual yaw rate signal ($\omega_g$) is detected. This prevents a sudden veer or spin out of the wheelchair. The rate of change term is also useful for rapidly recovering stability if the wheelchair suddenly loses control.

The saturation calculation block 33 continuously differentiates the actual yaw rate signal ($\omega_g$) and in each calculation cycle to determine a current yaw rate of change value $$\left|\frac{\Delta\omega_g}{\Delta T}\right|k_d$$

and compares this value with the value of the yaw rate of change used in the previous calculation cycle to determine the saturation value $\omega_{sat}$. If the current yaw rate of change value is the higher value, it is used in that calculation cycle to determine the next saturation value $\omega_{sat}$, otherwise it is discarded.

The values for the constants $\omega_{e,Threshold}$ and $IoError_{Threshold}$ are selected such that under normal wheelchair operating conditions (that is to say the wheelchair is moving in a stable manner and the yaw rate sensor system is functioning correctly) the conditions $|\omega_e|<\omega_{e,Threshold}$ and $IoError<IoError_{Threshold}$ are met.

When these conditions are met and the saturation calculation block 33 determines in a current calculation cycle that the current measured yaw rate of change value $$\left|\frac{\Delta\omega_g}{\Delta T}\right|k_d$$

is lower than the value of the yaw rate of change used in the previous calculation cycle to determine the saturation value $\omega_{sat}$ the value of the yaw rate of change used in the previous calculation cycle minus the value of the SlewRate is the value used in that calculation cycle to determine the next saturation value $\omega_{sat}$. Thus, the yaw rate of change value $$\left|\frac{\Delta\omega_g}{\Delta T}\right|k_d$$

is reduced by the slew rate in each consecutive calculation until it is determined that current measured yaw rate of change value $$\left|\frac{\Delta\omega_g}{\Delta T}\right|k_d$$

is higher and this higher value is used.

The yaw rate sensor 8a is firmly connected to the chassis of the wheelchair 1 and under normal operating conditions, the wheelchair's mass prevents the yaw rate sensor 8a from experiencing abnormally high yaw accelerations and thus rapid changes in the yaw rate sensor's 8a output do not occur.

In the event of a failure within the yaw rate sensor system, the actual yaw rate signal $\omega_g$ received by the saturation calculation block 33 is likely to be erroneous and to have a value that has jumped suddenly relative to the value of the pre-failure signal. Consequently the saturation calculation block 33 will generate a large value for $$\left|\frac{\Delta\omega_g}{\Delta T}\right|k_d$$

and in accordance with the above equation will reduce the variable limiter saturation level $\omega_{sat}$ to saturate the output and thereby prevent or at least make less likely, a sudden veer of the wheelchair 1.

A yaw rate sensor system failure will also likely cause an immediate increase in the value of the yaw rate error signal $\omega_e$. In a preferred embodiment, for as long as both the value of yaw rate error signal $\omega_e$ and the value of the IoError term remain above the respective thresholds $\omega_{e,Threshold}$ and $IoError_{Threshold}$, the relatively high rate of change of yaw rate term $$\left|\frac{\Delta\omega_g}{\Delta T}\right|k_d$$

used to calculate the variable limiter saturation level $\omega_{sat}$ is latched (i.e. held constant) for each consecutive calculation cycle. This tends to lower the variable limiter saturation limit $\omega_{sat}$ and results in the yaw demand to the motor arrangement being restricted. If the fault is a sustained one and consequently the yaw rate error signal $\omega_e$ and/or the value of the IoError term remain above their respective thresholds the yaw demand to the motor arrangement remains restricted and wheelchair safety is improved.

If the fault is a temporary fault or the high rate of change yaw rate term $$\left|\frac{\Delta\omega_g}{\Delta T}\right|k_d$$

occurs because of a sudden loss of stability rather then a yaw rate sensor failure, the variable limiter temporarily limits the yaw demand to the wheelchair until the yaw rate error ($\omega_e$) and the IoError term reduce below their given thresholds. The yaw rate of change term is then reduced at the given slew rate to allow the yaw control loop to recover and return to normal operation.

It can be understood from the above equation that when the value of $\omega_e$ is small, the value of the IoError term is correspondingly small. Thus, provided $$\left|\frac{\Delta\omega_g}{\Delta T}\right|k_d$$

is also small, $\omega_{sat}$ tends towards $\omega_{sat}=|\omega_r|+\omega_c$. These conditions tend to be met when the wheelchair 1 is travelling in a stable manner and in such circumstances the constant $\omega_c$ ensures that the value of $\omega_{sat}$ remains higher than $\omega_r$. This helps make the feel of driving the wheelchair comfortable for the wheelchair occupant. The constant $\omega_c$ also ensures that when so needed to recover stability, the yaw rate correction signal $\omega_u$ can cause a greater yaw rate demand to be applied to the motor arrangement than that called for by yaw rate reference signal ($\omega_r$).

Using the variable limiter 32 to generate the compensated yaw rate signal $\omega_o$, improves the stability of the wheelchair 1. If the wheelchair 1 is turning in an unstable manner the value $\omega_{sat}$ is automatically reduced and can become lower than $\omega_u$. Consequently, power to the drive wheels is restricted until stability is recovered.

Further improvements in wheelchair stability are made if the forward speed reference signal ($v_r$) and yaw rate reference signal ($\omega_r$) are automatically reduced when the magnitude of the variable limiter 32 output signal $\omega_u$ becomes limited by $\omega_{sat}$.

If this condition occurs, a signal is transmitted from the variable limiter 32 to the forward speed conditioning block 25 and the yaw rate signal conditioning block 26 which in response, reduces the forward speed reference signal ($v_r$) and the yaw rate reference signal ($\omega_r$) respectively, in accordance with the equations:

$$\text{forward reference deceleration rate} = \frac{\text{IoError} \times k_{fdecel}}{\Delta T}$$

$$\text{yaw rate reference deceleration rate} = \frac{\text{IoError} \times k_{ydecel}}{\Delta T}$$

Wherein, $k_{fdecel}$ is a pre-selected constant or forward reference deceleration weighting factor (typically $$\frac{k_{fdecel}}{\Delta T}$$

is 1 to 4), $k_{ydecel}$ is a pre-selected constant or yaw reference deceleration weighting factor (typically $$\frac{k_{ydecel}}{\Delta T}$$

is 1 to 4) and $\Delta T$ is the sample time (typically 10 to 50 milli-seconds).

To this end (although for simplicity it is not illustrated in FIG. 2), the forward speed conditioning block 25 is connected to the outputs of the turn rate signal conditioning block 26 and the variable limiter 32 to receive as input the respective signals $\omega_r$ and $\omega_o$ required to calculate the IoError term used in the forward reference deceleration calculation.

Similarly, (although again for simplicity it is not illustrated in FIG. 2) the turn rate signal conditioning block 26 is connected to the output of the variable limiter 32 to receive as input the signal $\omega_o$ required with the signal $\omega_r$ (generated by the turn rate signal conditioning block 26 itself) to calculate the IoError term used in the yaw reference deceleration calculation.

It will be appreciated that the forward speed conditioning block 25 and the turn rate signal conditioning block 26 are pre-programmed with the constants $k_{fdecel}$, $k_{ydecel}$ and $k_{ro}$ used in these calculations.

It can be understood from these equations, that the larger the value of $\omega_e$ (and hence the larger any instability in the wheelchair's movement) the more quickly the wheelchair is decelerated.

If stability is regained such that the variable limiter 32 output signal $\omega_u$ is no longer limited by $\omega_{sat}$, a further signal is transmitted from the variable limiter 32 to the forward speed conditioning block 25 and the yaw rate signal conditioning block 26, which in response cease the automatic deceleration of the wheelchair 1. It will be appreciated that in the event of sustained instability, for example following a failure of the yaw rate sensor 8a, the wheelchair will be slowed to a complete stop without significant veering. It will be appreciated that in the event of the output of the yaw control loop saturating, limiting the forward reference signal ($v_r$) and the yaw rate reference signal ($\omega_r$) allows the wheelchair to regain stability more safely and in a controlled manner.

The outputs of variable limiter 32 $\omega_o$ and the forward speed signal conditioning block $v_r$ are fed to a motor reference calculation block 34 which calculates left and right motor reference speeds $n_{left\ motor}$ and $n_{right\ motor}$ where:

$$n_{left\ motor} = (v_r + \omega_o)k_v$$

$$n_{right\ motor} = (v_r - \omega_o)k_v$$

$k_v$ is the motor speed scaler

The left and right motor reference speeds $n_{left\ motor}$ and $n_{right\ motor}$ are fed to their respective speed and torque control blocks 35 and 36 which in a standard way perform closed loop control of motor speed and motor torque and output numerical PWM (pulse width modulation) values $PWM_{left}$ and $PWM_{right}$ which are fed to a PWM controller 37. PWM controller 37 converts the numerical PWM values $PWM_{left}$ and $PWM_{right}$ to square wave drive signals whose duty cycles are proportional to the numerical PWM values and these signals are used to switch power electronics 38 to control the power to the left motor 39 and right motor 40 to drive the left and right wheels of the wheelchair respectively.

Using these techniques to control the drive motors of the wheelchair provides for improved wheelchair stability. For example, the wheelchair is less likely to spin out of control when traction is lost to the drive wheels, or to veer when driving along a camber or to veer if the left and right tyre pressures are not equal. The general feel of driving the wheelchair is improved for the use and the wheelchair is less likely to deviate from the user's intended course of travel when driving over obstacles.

Figure 3:
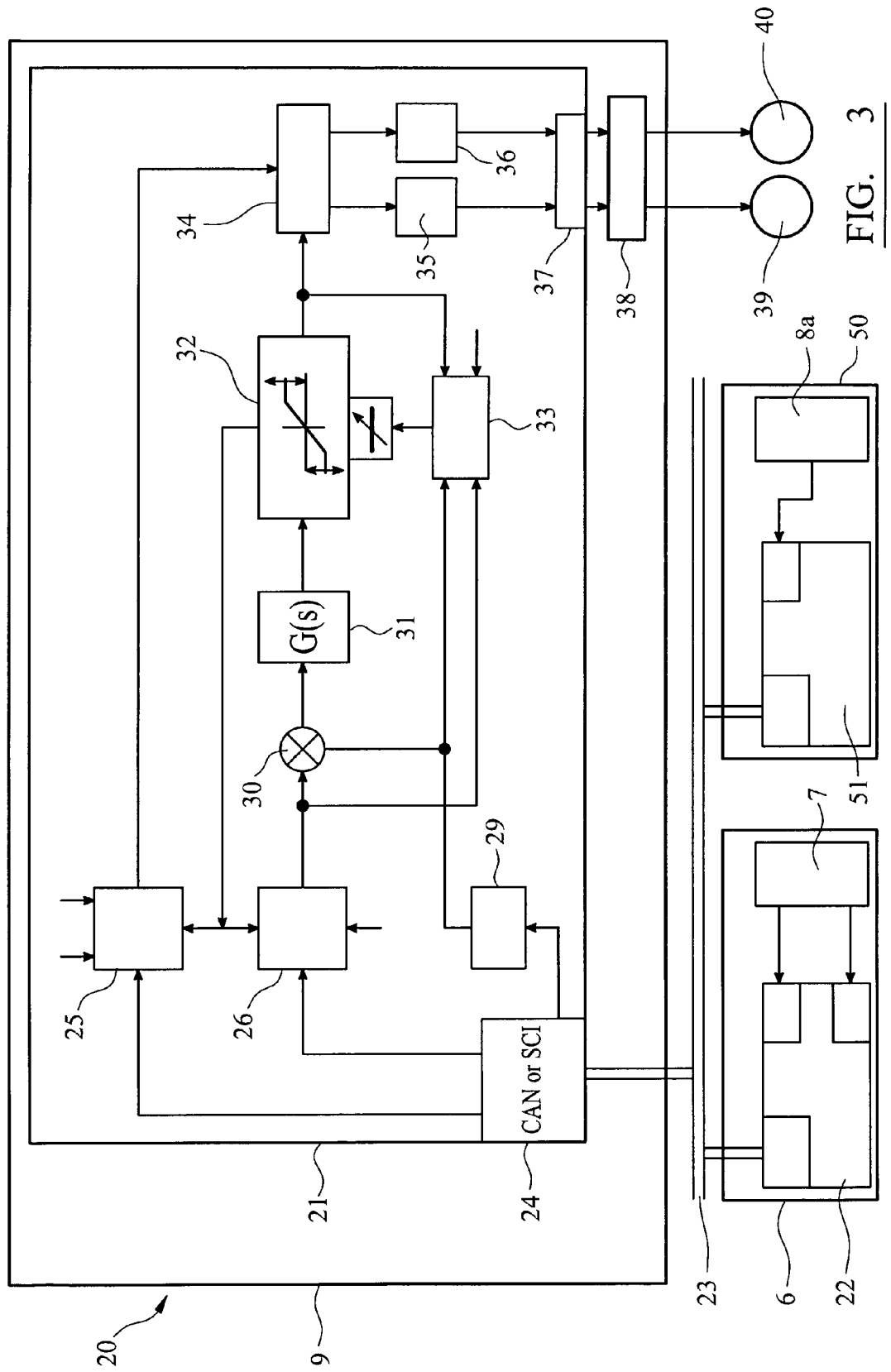
FIG. 3 another schematic diagram of a control system for a motorized wheelchair.

FIG. 3 illustrates an alternative control system 20' for controlling the wheelchair 1. The control system 20' is very similar to the control system illustrated in FIG. 2 and identical features have been given identical reference numerals. The only difference between the two systems is that in the control system 20' the yaw rate sensor 8 is provided in a module 50 together with a second microcontroller 51. The second microcontroller 51 receives the yaw rate signal (z) from the yaw rate sensor 8, converts the signal into a digital signal and outputs the digital signal in a suitable digital communications format, for example Serial Communications Interface (SCI) or Controller Area Network (CAN) on the BUS system 23 connected to the data input port 24 of the microprocessor 21. The digital signal is fed from the data input port 24 for processing at the yaw rate sensor signal conditioning block 29, as described herein above.

It will be appreciated that embodiments of the invention are not limited to the precise relationship for determining $\omega_{sat}$ as given above. In particular, embodiments of the invention may make use of one or other of the terms YawRateOfChange$_n$ and IoError to determine $\omega_{sat}$. Other variations for the relationship for determining $\omega_{sat}$ will be apparent to the skilled person.

In addition, different equations from those described above may be used to determine the forward and yaw rate reference deceleration rates, for example $$\text{forward reference deceleration rate} = \frac{|v_r|k_{v_r} + |\omega_e|k_{\omega_e} + |\omega_r - \omega_o|k_{\omega_{ro}}}{\Delta T}$$

$$\text{yaw rate reference deceleration rate} = \frac{|\omega_r|k_{v_\omega} + |\omega_e|k_{\omega_e} + |\omega_r - \omega_o|k_{\omega_{ro}}}{\Delta T}$$

$k_{v_r}$ = forward reference deceleration weighting factor ($k_{v_r} >= 0$)

$k_{v_\omega}$ = yaw rate reference deceleration weighting factor ($k_{v_\omega} >= 0$)

$k_{\omega_e}$ = yaw rate error weighting factor ($k_{\omega_e} >= 0$)

$k_{\omega_{ro}}$ = control loop input output error weighting factor ($k_{\omega_{ro}} >= 0$)

$\Delta T$ = sample time in seconds

Having thus described the present invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements.

The invention claimed is:

1. A control system for controlling a motor arrangement for differentially driving left and right wheels of a motorized vehicle, the control system comprising:
   a comparator for receiving a yaw rate sensor signal from a yaw rate sensor, the yaw rate sensor signal being indicative of an actual yaw rate of the vehicle and for receiving a yaw rate reference signal generated by a user input device, the yaw rate reference signal being indicative of a user demanded yaw rate for the vehicle, the comparator arranged to output a yaw rate error signal based on a difference between the yaw rate signal and the yaw rate reference signal;
   a compensator that generates a yaw rate correction signal based upon the yaw rate error signal, wherein the yaw rate correction signal is configured to reduce the yaw rate error signal;
   a motor control function that is configured to control the motor arrangement of the motorized vehicle based upon the yaw rate error correction signal generated by the compensator;
   a variable limiter, operably coupled between the compensator and the motor control function, that is configured to limit the yaw rate correction signal supplied to the motor control function to values within a variable maximum yaw rate correction limit; and
   a limit calculator for continuously calculating the variable maximum yaw rate correction limit in dependence upon at least one signal supplied to the limit calculator.

2. A control system according to claim 1, wherein:
   at any given time, the limit calculator calculates the variable maximum yaw rate correction limit at least in part in dependence upon a value of a term that depends upon a difference between a current value of the yaw rate reference signal and a current value of the yaw rate correction signal.

3. A control system according to claim 1, wherein:
   during a first calculation cycle, the limit calculator calculates a first rate of change value using a first current value of a rate of change of the yaw rate sensor signal and calculates the variable maximum yaw rate correction limit at least in part dependence upon the first rate of change value.

4. A control system according to claim 3, wherein:
   during a second calculation cycle immediately following a first calculation cycle, the calculator calculates a second rate of change value using a second current value of the rate of change of the yaw rate sensor signal and calculates the variable maximum yaw rate correction limit at least in part in dependence upon the second rate of change value if it is higher than the first rate of change value.

5. A control system according to claim 4, wherein:
   during the second calculation cycle, if the first rate of change value is higher than the second rate of change value, the first rate of change value is reduced by a pre-determined amount and the calculator calculates the variable maximum yaw rate correction limit at least in part in dependence upon the reduced first rate of change value.

6. A control system according to claim 3, wherein:
   the calculator calculates the first rate of change value if at least one threshold value is exceeded and calculates the variable maximum yaw rate correction limit at least in part in dependence upon the first rate of change value during each subsequent calculation period provided the at least one threshold value remains exceeded.

7. A control system according to claim 6, wherein:
   the at least one threshold value comprises a threshold value for the yaw rate error signal or a threshold value for a difference between current values of the yaw rate reference signal and the yaw rate correction signal.

8. A control system according to claim 1, further comprising:
   a yaw rate reference signal processing block for processing the yaw rate reference signal received from the user input device and outputting a processed yaw rate reference signal to the comparator, the yaw rate reference signal processing block arranged to reduce the value of the yaw rate reference signal when the value of the yaw rate correction signal is being saturated by the variable limiter.

9. A control system according to claim 8, wherein:
   the yaw rate reference signal processing block is arranged to reduce the value of the yaw rate reference signal at a rate that depends upon the difference between a current value of the yaw rate reference signal and the yaw rate correction signal.

10. A control system according to claim 1, further comprising:
    a speed reference signal processing block for processing a speed reference signal received from the user input device indicative of a user demanded speed for the vehicle and outputting a processed speed reference signal for use in controlling the motor arrangement, the speed reference signal processing block arranged to reduce the value of the speed reference signal when the value of the yaw rate correction signal is being saturated by the variable limiter.

11. A control system according to claim 10, wherein:
the speed reference signal processing block is arranged to reduce the value of the speed reference signal at a rate that depends upon a difference between a current value of the yaw rate reference signal and the yaw rate correction signal.

12. A control system according to claim 1, wherein:
the limit calculator calculates the variable maximum yaw rate correction limit at least in part in dependence upon a value of a programmable constant, the value of the programmable constant selected such that when required, the yaw rate correction signal can apply a greater yaw rate demand to the motor arrangement than a current user demanded yaw rate indicated by the yaw rate reference signal.

13. A control system according to claim 1, wherein:
in calculating the variable maximum yaw rate correction limit at any given time, the limit calculator subtracts a first value from a second value, the first value calculated in dependence upon the one or more signals supplied to the limit calculator, and the second value calculated from a sum of a current value of the yaw rate reference signal and a further value.

14. A control system according to claim 13, wherein:
the further value is a predetermined constant.

15. A control system according to claim 1, wherein:
the compensator is a PI or PID compensator.

16. A motorized vehicle comprising a control system as claimed in claim 1.

17. A motorized vehicle according to claim 16, wherein:
the vehicle is a wheelchair.

18. A control system according to claim 1, wherein:
the motor control controls output of the electrical motors by controlling pulse width modulation of respective electrical power signals supplied to the electrical motors.

19. A control system for controlling electric motors that drive left and right wheels of an electrically-powered wheel chair, the control system comprising:
a comparator for receiving a yaw rate sensor signal from a yaw rate sensor, the yaw rate sensor signal being indicative of an actual yaw rate of the vehicle and for receiving a yaw rate reference signal generated by a user input device, the yaw rate reference signal being indicative of a user demanded yaw rate for the vehicle, the comparator arranged to output a yaw rate error signal based on a difference between the yaw rate signal and the yaw rate reference signal;
a compensator that generates a yaw rate correction signal based upon the yaw rate error signal, wherein the yaw rate correction signal is configured to reduce the yaw rate error signal;
a motor control function that is configured to control the motor arrangement of the motorized vehicle based upon the yaw rate error correction signal generated by the compensator;
a variable limiter, operably coupled between the compensator and the motor control function, that is configured to limit the yaw rate correction signal supplied to the motor control function to values within a variable maximum yaw rate correction limit; and
a limit calculator for continuously calculating the variable maximum yaw rate correction limit in dependence upon at least one signal supplied to the limit calculator.

* * * * *